United States Patent
Saito et al.

(10) Patent No.: US 6,656,865 B2
(45) Date of Patent: Dec. 2, 2003

(54) DIELECTRIC CERAMIC COMPOSITION AND CERAMIC CAPACITOR

(75) Inventors: Kenji Saito, Tokyo (JP); Koichiro Morita, Tokyo (JP); Youichi Mizuno, Tokyo (JP); Yasunobu Kawamoto, Tokyo (JP); Yoshikazu Okino, Tokyo (JP); Noriyuki Kohzu, Tokyo (JP); Hirokazu Chazono, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 209 days.

(21) Appl. No.: 09/894,004

(22) Filed: Jun. 29, 2001

(65) Prior Publication Data

US 2002/0016249 A1 Feb. 7, 2002

(30) Foreign Application Priority Data

Jun. 30, 2000 (JP) .......................................... 2000-198239

(51) Int. Cl.$^7$ .......................... C04B 35/468; H01G 4/10
(52) U.S. Cl. ........................ 501/137; 501/138; 501/139; 361/321.2; 361/321.4; 361/321.5
(58) Field of Search .................................. 501/137, 138, 501/139; 361/321.4, 311, 321.2, 321.5

(56) References Cited

U.S. PATENT DOCUMENTS 5,790,367 A * 8/1998 Mateika et al. .......... 361/321.4

FOREIGN PATENT DOCUMENTS

EP 0877399 * 11/1998

* cited by examiner

*Primary Examiner*—David Brunsman
(74) *Attorney, Agent, or Firm*—Bacon & Thomas, PLLC

(57) ABSTRACT

A ceramic capacitor containing at least one dielectric layer formed from a dielectric ceramic composition comprising a sintered body containing ceramic particles having a core/shell structure in an amount of 15% or more based on the total ceramic particles of the sintered body, the core/shell structured particle being composed of a core portion, which is $BaTiO_3$ crystal, and a shell portion surrounding the core portion, which is made of a solid solution comprising $BaTiO_3$ as a major component, has excellent temperature characteristics and a long life-time.

14 Claims, 1 Drawing Sheet

DIELECTRIC CERAMIC COMPOSITION AND CERAMIC CAPACITOR

FIELD OF THE INVENTION

The present invention relates to a dielectric ceramic composition and a ceramic capacitor fabricated using the same, and more particularly, to a dielectric ceramic composition having excellent temperature characteristics and a long life-time and to a ceramic capacitor comprising a dielectric layer formed from said composition.

BACKGROUND OF THE INVENTION

A ceramic capacitor generally consists of a sintered body in the form of a chip, and a pair of external electrodes formed on both terminals of the chip. The sintered body is a multi-layered material wherein several dielectric layers and internal electrodes are alternately laminated. In such a multilayer capacitor, adjacent two internal electrodes are aligned with one dielectric layer sandwitched therebetween and are each electrically connected to the external electrodes.

As a material for forming a dielectric layer of a ceramic capacitor, there has been hitherto employed, e.g., a reduction resistive dielectric ceramic composition comprising barium titanate ($BaTiO_3$) as a major component, and a rare earth metal element as an additional component. Further, as a material for forming an internal electrode of a ceramic capacitor, a sintered conductive paste comprising, e.g., a Ni metal powder as a major component has been employed.

The sintered body of a ceramic capacitor may be prepared by overlaying a green ceramic sheet and an internal electrode pattern alternately and intimately to provide a multi-layered chip, evaporating a binder component from the chip, sintering the chip at a high temperature of about 1200~1300° C. under a non-oxidizing atmosphere and then subjecting the sintered chip to a re-oxidization under a weakly oxidizing atmosphere.

Recently, there exists a need to develop electronic parts as well as electronic machines having enhanced electrical properties. Particularly, in case of a ceramic capacitor, many efforts have been made to improve the temperature and life-time characteristics.

SUMMARY OF THE INVENTION

It is, therefore, a primary object of the invention to provide a dielectric ceramic composition having improved temperature characteristics and a long life-time.

It is a second object of the invention to provide a ceramic capacitor comprising a dielectric layer formed from the inventive dielectric ceramic composition.

In accordance with an aspect of the present invention, there is provided a dielectric ceramic composition comprising a sintered body containing ceramic particles having a core/shell structure (hereinafter, "core/shell structured particles") in an amount of 15% or more based on the total ceramic particles of the sintered body, the core/shell structured particle being composed of a core portion, which is a $BaTiO_3$ crystal, and a shell portion surrounding the core, which is made of a solid solution containing $BaTiO_3$ as a major component.

Further, in accordance with the present invention, there is provided a ceramic capacitor comprising at least one dielectric ceramic layer formed from the inventive dielectric ceramic composition, and at least two internal electrodes between which the dielectric ceramic layer is inserted.

BRIEF DESCRIPTION OF THE DRAWING

The above and other objects and features of the present invention will become apparent from the following description of preferred embodiments given in conjunction with the accompanying drawing.

DETAILED DESCRIPTION OF THE INVENTION

Figure 1:
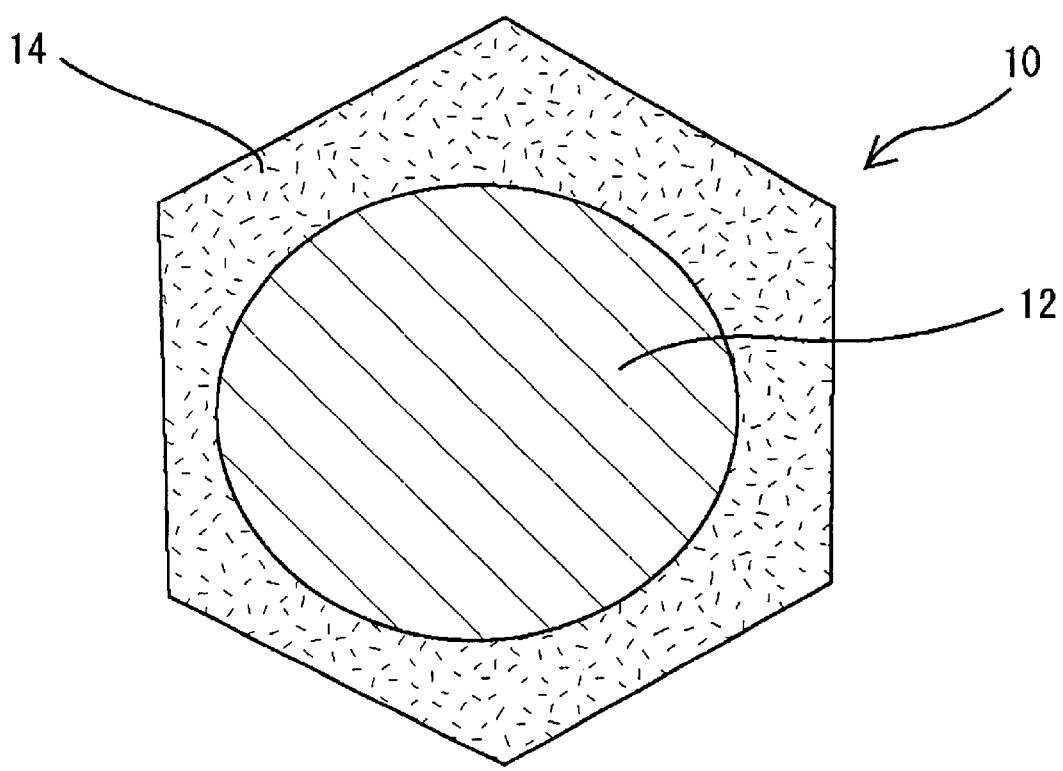
FIG. 1 represents the structure of the core/shell structured particles schematically.

An observation with a transmission electronic microscope (TEM) show that the dielectric ceramic composition of the present invention contains (a) core/shell structured particles, (b) particles made only of $BaTiO_3$ crystals and (c) particles made only of a solid solution of $BaTiO_3$ containing an additive dissolved therein.

In the inventive composition, the limitation of "the core/shell structured particles in an amount of 15% or more based on the total ceramic particles of the sintered body" means that the ratio of the (a) particles (the core/shell structured particles) to the sum of the (a), (b) and (c) particles is 15% or greater.

When the ratio is less than 15%, it is difficult to obtain a ceramic capacitor having D temperature characteristics as defined in JIS specification. Further, when the ratio is 30% or greater, it possible to obtain a ceramic capacitor having B temperature characteristics. The ratio may be adjusted by varying the process parameters for the preparation of the particles, e.g., the sintering time and temperature, the composition of additives, the pulverizing or dispersing time, etc.

In the core/shell structured particles of the present invention, the shell portion may wrap the core portion completely or incompletely. Further, the core portion may be formed from pure $BaTiO_3$ or $BaTiO_3$ containing a trace amount of Sr and/or Ca.

Further, the shell portion may comprise at least one element selected from Y, Sm, Eu, Gd, Tb, Dy, Ho, Er, Tm and Yb, or Mg, or at least one element selected from Cr, V, Mn, Co and Ni.

The shell portion may further comprise at least one element selected from Nb, Ta, Mo and W. In addition, the shell portion may further comprise at least one element selected from Si, Li, B, Na and K. Furthermore, the shell portion may further comprise Zr and/or Hf.

In accordance with the present invention, as mentioned above, a ceramic capacitor having D temperature characteristics as defined in JIS specification can be obtained by way of controlling the ratio of the core/shell structured particles to the total ceramic particles to a range of greater than 15%.

Further, in accordance with the present invention, a ceramic capacitor having B temperature characteristics as defined in JIS specification can be obtained by way of controlling the ratio of the core/shell structured particles to the total ceramic particles to a range of greater than 30%.

The following Examples are given for the purpose of illustration only and are not intended to limit the scope of the invention.

EXAMPLE 1

Powders of $BaTiO_3$ (previously prepared and containing $SrCO_3$ as a impurity), $Ho_2O_3$, MgO, $MnO_2$, $V_2O_5$, $Cr_2O_3$, $WO_3$, $ZrO_2$ and $SiO_2$ were weighed in amounts as specified in Table 1 and mixed for about 20 hours by a wet method in a ball mill in which PSZ (partially sterilized zirconia) balls and water were included. The slurry thus obtained was dehydrated and then heated at about 150° C. for 15 hours to dry it.

TABLE 1

| Compound | Weight (g) | Parts by Moles |
| --- | --- | --- |
| $BaTiO_3$ | 100 | 100 |
| $Ho_2O_3$ | 1.62 | 1.0 |
| MgO | 0.17 | 1.0 |
| $MnO_2$ | 0.149 | 0.4 |
| $V_2O_5$ | 0.039 | 0.05 |
| $Cr_2O_3$ | 0.196 | 0.3 |
| $WO_3$ | 0.099 | 0.1 |
| $ZrO_2$ | 0.026 | 0.05 |
| $SiO_2$ | 0.52 | 2.01 |

Thereafter, the dried ceramic slurry was ground and then calcined in air at about 800° C. for 2 hours. The calcination product was then disaggregated by a wet method in a ball mill with added ethanol. Next, the disaggregated ceramic slurry was heated at about 150° C. for 4 hours, thereby obtaining a dry powder of the calcined ceramic product.

To 1000 g of the resulting powder (100 parts by weight) were added an organic binder comprising an acrylic ester polymer, glycerin and an aqueous solution of a condensed phosphate in an amount of 15 wt % and water in an amount of 50 wt %, based on the resulting powder. The resulting mixture was mixed and titurated in a ball mill to obtain a slurry.

The slurry was then degassed in a vacuum aspirator, and coated on a polyester film using a reverse roll coater to obtain a film, which was dried by heating at 100° C., and the polyester film was removed to obtain a 10 cm×10 cm square green ceramic sheet having a thickness of 5 μm.

Meanwhile, 10 g of a nickel powder having an average diameter of about 0.5 μm and 1.0 g of ethylcellulose dissolved in 9.0 g of butyl carbitol were mixed in a stirrer for 10 hours to form a conductive paste for use in forming internal electrodes of a ceramic capacitor. Thereafter, the conductive paste was printed on the above ceramic green sheets to form a conductive pattern thereon and then the printed conductive paste was dried.

Subsequently, ten sheets of the ceramic green having the conductive pattern printed thereon were stacked against each other with the conductive patterns facing upward, thereby forming a laminated body. Every two neighboring sheets were disposed in such a manner that the conductive patterns provided thereon were shifted by one half of a pattern size along the length direction. The laminated body also included one or more ceramic dummy sheets stacked against each of the uppermost and the lowermost ceramic green sheets having conductive patterns printed thereon, the ceramic dummy sheets having no conductive patterns printed thereon.

Next, the laminated body was pressed with a load of about 40 tons at about 50° C. along the stacking direction of the ceramic sheets in the laminated body. Afterwards, the pressed laminated body was diced into a multiplicity of chip shaped ceramic bodies having a size of about 3.2 mm×1.6 mm.

Thereafter, Ni external electrodes were formed at two opposite sides of each respective chip shaped ceramic body by, e.g., a dipping method, one end portion of each of the internal electrodes being exposed to one of the two opposite sides of each chip shaped ceramic body. Then, the chip shaped ceramic bodies were loaded into a sintering furnace and heated under an $N_2$ atmosphere to remove the organic binder contained therein. Then, the binder-free chip shaped ceramic bodies were sintered at various temperatures ranging from 1260 to 1360° C. for 1 to 5 hours under an atmosphere with oxygen partial pressure of $10^{-5}$ to $10^{-10}$ atm. Thereafter, the sintered chip-shaped ceramic bodies were re-oxidized in an oxidative atmosphere to thereby obtain multilayer ceramic capacitors comprising dielectric layers, internal electrodes and external electrodes.

The cross-section of the dielectric layer of the multilayer ceramic capacitor thus obtained was observed with an electronic microscope, and as a result, it was confirmed that the dielectric layer had core/shell structured particles as shown in FIG. 1 wherein 10, 12 and 14 represents a core/shell structured particles, a core portion and a shell portion, respectively.

Further, the ratio of the core/shell structured particles in the dielectric layer and the electrical characteristics on the multilayer ceramic capacitors were measured and the results of the measurement are represented in Table 2.

The electrical characteristics of the multilayer ceramic capacitors were obtained as follows.

(A) Relative permittivity (or dielectric constant) ε was computed based on the facing area of a pair of neighboring internal electrodes, the thickness of a dielectric layer positioned between the pair of neighboring internal electrodes, and the capacitance of a multilayer ceramic capacitor obtained under the condition of applying a voltage of 1.0 V (root mean square value) at 20° C. with a frequency of 1 kHz.

(B) Dielectric loss tan δ (%) was obtained under the same condition as established for measuring the permittivity mentioned above.

(C) Resistivity (Ωcm) was acquired by measuring the resistance between the pair of external electrodes after DC 25 V was applied for 60 seconds at 20° C. The number following "E" in the notation of a resistivity value presented in Table 2 represents an order. For instance, 2.5E+12 represents $2.5 \times 10^{12}$.

(D) Accelerated life (second) was obtained by measuring the time required until the insulation resistivity (ρ) became $1 \times 10^{10}$ Ωcm in a DC electric field of 20 V/μm at a temperature of 150° C.

(E) Capacitance variation ΔC (%) was obtained by measuring the capacitance values at −25° C. and +85° C. in a thermostatic (or constant temperature) oven under the condition of applying a voltage of 1 V (rms value) with a frequency of 1 KHz, and determining the variation of the measured capacitance values from the values of the capacitance at 20° C. of the same sample.

TABLE 2

| Sample No. | Sintering Temp. (° C.) | Sintering Time (hr) | Tan δ (%) | Resistivity (Ω cm) | Accelerated Life (sec) | Capacitance Variation | | Temp. Characteristics | Ratio of Core/Shell Structured Particles |
|---|---|---|---|---|---|---|---|---|---|
| | | | | | | Δ C$_{-25/20}$ | Δ C$_{+85/20}$ | | |
| 1* | 1,360 | 5 | 26 | 3.5E+13 | 278 | −68.5 | 30.0 | — | 0.0 |
| 2* | 1,350 | 2 | 18 | 1.9E+13 | 3,820 | −39.8 | −5.8 | D | 5.0 |
| 3 | 1,260 | 2 | 9 | 5.2E+11 | 305,440 | −10.9 | −25.4 | D | 15.0 |
| 4 | 1,340 | 5 | 6 | 3.9E+11 | 498,750 | −7.3 | −15.9 | B | 24.0 |
| 5 | 1,280 | 2 | 5 | 2.0E+12 | 386,190 | −4.2 | −8.9 | B | 30.0 |
| 6 | 1,300 | 2 | 3 | 4.8E+11 | 549,820 | −3.7 | −8.5 | B | 37.0 |
| 7 | 1,320 | 2 | 3 | 1.5E+11 | 659,980 | −2.6 | −7.9 | B | 55.0 |
| 8 | 1,320 | 5 | 3 | 2.8E+11 | 552,920 | −0.5 | −6.1 | B | 72.0 |
| 9 | 1,330 | 5 | 2 | 3.6E+12 | 934,890 | 0.0 | −6.0 | B | 75.0 |
| 10 | 1,340 | 1 | 3 | 1.5E+12 | 623,910 | −2.2 | −5.8 | B | 80.0 |

*represents a comparative example

As can be seen from Table 2, when the core/shell structured particles are contained in the ceramic composition in an amount of 15% or more, a ceramic capacitor having D temperature characteristics as defined in JIS specification as well as having a long life time can be obtained, and when the amount is 30% or more, it possible to obtain a ceramic capacitor having B temperature characteristics.

Further, in the core/shell structured particles of the dielectric layer of the multilayer ceramic capacitor, the crystal structure of the core portion was compared with that of the shell portion, and confirmed that the core portion is nearly pure $BaTiO_3$ crystal, whereas the shell portion is made of a solid solution of $BaTiO_3$ containing an additive.

Further, the component of the additive in the shell portion was analyzed to confirm that Ho, Mg, Mn, V, Cr, W and Zr are included.

While the invention has been described in connection with the above specific embodiments, it should be recognized that various modifications and changes may be made to the invention by those skilled in the art without departing from the scope of the invention as defined by the appended claims.

What is claimed is:

1. A dielectric ceramic composition comprising a sintered body containing (a) core/shell structured particles, (b) particles made only of $BaTiO_3$ crystals and (c) particles mad only of a solid solution of $BaTiO_3$ containing an additive dissolved therein, the core/shell structured particle being composed of a $BaTiO_3$ crystal core and a shell surrounding the core, which is made of a solid solution comprising $BaTiO_3$ as a major component, and the amount of said core/shell structured particles being 150% by weight or more based on the total ceramic particles of the sintered body.

2. The dielectric ceramic composition of claim 1, wherein the core/shell structured particles are conta ned in an amount of 30% or more based on the total ceramic particles of the sintered body.

3. The dielectric ceramic composition of claim 1, wherein the core portion further comprises Sr or Ca, or a mixture thereof.

4. The dielectric ceramic composition of claim 1, wherein the shell portion further comprises: (1)at least one element selected rom Y, Sm, Eu, Gd, Tb, Dy, Ho, Er, Tm and Yb; (2) Mg; an (3) at least one element selected from Cr, V, Mn, Co and Ni.

5. The dielectric ceramic composition of claim 4, wherein the shell portion further comprises at least one element selected from Nb, Ta, Mo and W.

6. The dielectric ceramic composition of claim 4, wherein the shell portion further comprises at least one element selected rom Si, Li, B, Na and K.

7. The dielectric ceramic composition of claim 4, wherein the shell F portion further comprises Zr or Hf, or a mixture thereof.

8. A ceramic capacitor comprising at least one dielectric ceramic layer formed from dielectric ceramic composition and at least two internal electrodes between which th dielectric ceramic layer is inserted, characterized in that the dielectric ceramic composition comprises a sintered body containing (a) core/shell structured particles, (b) particles made only of $BaTiO_3$ crystals and (c) particles made only of a solid solution of $BaTiO_3$ containing an additive dissolved therein, the core/shell structured ceramic particles being composed of a $BaTiO_3$ core and a shell surrounding the core, which is made of a solid solution comprising $BaTiO_3$ as a major component, the amount of said core/shell structured particles being 15% by weight or more based on the total ceramic particles of the sintered body.

9. The ceramic capacitor of claim 8, wherein the core/shell structured particles are contained in a amount of 30% or more based on the total ceramic particles of the sintered body.

10. The ceramic capacitor of claim 8, wherein the core portion further comprises Sr or Ca, or a mixture thereof.

11. The ceramic capacitor of claim 8, wherein the shell portion further comprises: (1) at least one element selected from Y, Sm, Eu, Gd, Tb, Dy, Ho, Er, Tm and Yb; (2) Mg; and (3) at least one element selected from Cr, V, Mn, Co and Ni.

12. The ceramic capacitor of claim 11, wherein the shell portion further comprises at least one element selected form Nb, Ta, Mo and W.

13. The ceramic capacitor of claim 11, wherein the shell portion further comprises at least one element selected from Si, Li, B, Na and K.

14. The ceramic capacitor of claim 11, wherein the shell portion further comprises Zr or Hf, or a mixture thereof.

* * * * *

UNITED STATES PATENT AND TRADEMARK OFFICE
CERTIFICATE OF CORRECTION

PATENT NO. : 6,656,865 B2
DATED : December 2, 2003
INVENTOR(S) : Saito et al.

It is certified that error appears in the above-identified patent and that said Letters Patent is hereby corrected as shown below:

<u>Column 5,</u>
Line 48, "150%" should be -- 15% --.

Signed and Sealed this

Seventh Day of March, 2006

JON W. DUDAS
*Director of the United States Patent and Trademark Office*